US012022425B2

(12) United States Patent
Kim et al.

(10) Patent No.: US 12,022,425 B2
(45) Date of Patent: Jun. 25, 2024

(54) METHOD AND APPARATUS FOR CONTROLLING EARLY DATA TRANSMISSION PROCEDURE IN A WIRELESS COMMUNICATION SYSTEM

(71) Applicant: LG ELECTRONICS INC., Seoul (KR)

(72) Inventors: Seokjung Kim, Seoul (KR); Hyunjung Choe, Seoul (KR); Jian Xu, Seoul (KR); Daewook Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 416 days.

(21) Appl. No.: 17/310,030

(22) PCT Filed: Feb. 5, 2020

(86) PCT No.: PCT/KR2020/001654
§ 371 (c)(1),
(2) Date: Jul. 12, 2021

(87) PCT Pub. No.: WO2020/166872
PCT Pub. Date: Aug. 20, 2020

(65) Prior Publication Data
US 2022/0104169 A1    Mar. 31, 2022

(30) Foreign Application Priority Data

Feb. 15, 2019    (KR) .......................... 10-2019-0018228

(51) Int. Cl.
*H04W 76/19*    (2018.01)
*H04W 60/04*    (2009.01)
(Continued)

(52) U.S. Cl.
CPC .......... *H04W 68/005* (2013.01); *H04W 60/04* (2013.01); *H04W 76/19* (2018.02); *H04W 76/20* (2018.02)

(58) Field of Classification Search
CPC ...... H04W 76/19; H04W 76/20; H04W 60/04
(Continued)

(56) References Cited

U.S. PATENT DOCUMENTS

2016/0157218 A1*  6/2016  Nam ..................... H04B 7/0632
                                                         370/329
2023/0262818 A1*  8/2023  Kim ....................... H04W 76/19
                                                         370/328

OTHER PUBLICATIONS

PCT International Application No. PCT/KR2020/001654, International Search Report dated Feb. 5, 2020, 1 pages.
(Continued)

*Primary Examiner* — Dang T Ton
(74) *Attorney, Agent, or Firm* — LEE, HONG, DEGERMAN, KANG & WAIMEY

(57) ABSTRACT

A method and apparatus for controlling mobile early data transmission (EDT) procedure in a wireless communication system is provided. A first core network node, in a wireless communication, receives, from a second core network node, a message for a downlink Data including a size of the downlink data. The first core network node determines whether to initiate an early data transmission (EDT) procedure for the downlink data based on the size of the downlink data. The first core network node transmits, to a radio access network (RAN) node, a paging message including information related to the EDT procedure for the downlink data based on the decision to initiate the EDT procedure for a wireless device.

3 Claims, 14 Drawing Sheets

(51) Int. Cl.
*H04W 68/00* (2009.01)
*H04W 76/20* (2018.01)

(58) Field of Classification Search
USPC .................................. 370/329, 400, 401, 403
See application file for complete search history.

(56) References Cited

OTHER PUBLICATIONS

Mediatek Inc., "Mobile-terminated Early Data Transmission," R2-1818210, 3GPP TSG-RAN WG2 Meeting #104, Nov. 2018, 7 pages.
ZTE, "Options comparison for MT EDT," R2-1816884, 3GPP TSG-RAN2 meeting#104, Nov. 2018, 12 pages.
NEC, "Key Issue #1 Solution: Single downlink packet delivery via EDT," S2-188496, SA WG2 Meeting #128 bis, Aug. 2018, 5 pages.
Huawei et al., "Discussion on MT-EDT options," R2-1901144, 3GPP TSG-RAN WG2 Meeting #105, Mar. 2019, 8 pages.
Qualcomm Incorporated., "MT-initiated EDT," R2-1814037, 3GPP TSG-RAN WG2 Meeting #103bis, Oct. 2018, 8 pages.

\* cited by examiner

METHOD AND APPARATUS FOR CONTROLLING EARLY DATA TRANSMISSION PROCEDURE IN A WIRELESS COMMUNICATION SYSTEM

CROSS-REFERENCE TO RELATED APPLICATIONS

This application is the National Stage filing under 35 U.S.C. 371 of International Application No. PCT/KR2020/001654, filed on Feb. 5, 2020, which claims the benefit of earlier filing date and right of priority to Korean Application No. 10-2019-0018228, filed on Feb. 15, 2019, the contents of which is hereby incorporated by reference herein in its entirety.

TECHNICAL FIELD

The present disclosure relates to a method and apparatus for controlling mobile early data transmission (EDT) procedure in a wireless communication system.

RELATED ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in an international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Radio resource control (RRC) inactive state (or RRC idle state with suspend) is a new state added in 5G NR compare to 4G LTE. Motivation to use this state seems to reduce the time to bring user equipment (UE) in connected state from other states. This will increase UE battery life and latency as well because of less signaling involved. Both UE and gNB stores access stratum (AS) context in this state and bringing to RRC connected state from inactive state would not involve NAS level signaling.

In Rel-13, narrowband internet-of-things (NB-IoT) and LTE for machine-type communication (LTE-M) were standardized to provide wide-area connectivity for IoT. The technologies in Rel-14 evolved beyond the basic functionality specified in Rel-13. In Rel-15, to optimize the support for infrequent small data packet transmissions, a mechanism for data transmission during the random access procedure is specified for NB-IoT and LTE-M. This mechanism may be referred to as early data transmission (EDT) and can improve the device battery life and reduces the message latency.

A mechanism referred Mobile terminated (MT)-EDT has been studied for a data transmission triggered by a network. For example, a network may transmit downlink (DL) data to a wireless device via MT-EDT procedure.

SUMMARY

An EDT procedure is a mechanism for transmitting a small size of data without entering to a connected state. The EDT procedure may be triggered depending on the size of data for transmission. Since the MT-EDT may be triggered by a network, the network may consider the size of the data before initiating the MT-EDT procedure.

However, there is no relevant procedures considering the size of the data for the MT-EDT procedure. Therefore, studies for controlling EDT procedure based on the data size will be needed.

In addition, there are several MT-EDT options. One of the options is a DL data transmission after preamble. In particular, a wireless device may receive an MT data from a network, after transmitting a RACH preamble to the network. However, this option has some technical problems.

This option does not consider a mobility case of a wireless device. When a wireless device accesses to a new radio access network (RAN) node different from an old RAN node where a connection was suspended, the new RAN node does not have the context (for example, UE context) of the wireless device to reactivate the AS security. Thus, retrieving procedure for the context from the old RAN node is needed to be performed.

However, there is no relevant information related to the old RAN node in the preamble from the wireless device. To avoid this problem, studies for controlling EDT procedure for movement of a wireless device are still needed.

In an aspect, a method performed by a first core network node in a wireless communication is provided. A first core network node receives, from a second core network node, a message for a downlink Data including a size of the downlink data. A first core network node determines whether to initiate an early data transmission (EDT) procedure for the downlink data based on the size of the downlink data. A first core network node transmits, to a radio access network (RAN) node, a paging message including information related to the EDT procedure for the downlink data based on the decision to initiate the EDT procedure for a wireless device.

In another aspect, a first core network node in a wireless communication system is provided. A first core network node may include a memory, a transceiver, and a processor which is operably coupled to the memory and the transceiver. A processor is configured to control the transceiver to receive, from a second core network node, a message for a downlink Data including a size of the downlink data. A processor is configured to determine whether to initiate an early data transmission (EDT) procedure for the downlink data based on the size of the downlink data. A processor is configured to control the transceiver to transmit, to a radio access network (RAN) node, a paging message including information related to the EDT procedure for the downlink data based on the decision to initiate the EDT procedure for a wireless device.

The present disclosure may have various advantageous effects.

According to some embodiments of the present disclosure, an apparatus and method for controlling EDT procedure in a wireless communication system are provided.

For example, RAN nodes in the tracking area may recognize that EDT procedure for a wireless device is triggered by receiving an information related to the EDT procedure such as DL data size or EDT indication. Therefore, the RAN node may control EDT procedure efficiently.

For example, the new RAN node may find the old RAN node where connection with the wireless device is suspended, based on the information, such as a Resume ID, including the paging message from the core network node. Therefore, the loss of DL data could be prevented and unnecessary latency due to the data retransmission could be reduced. Furthermore, it could make experience of the wireless device better.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C" or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Figure 1:
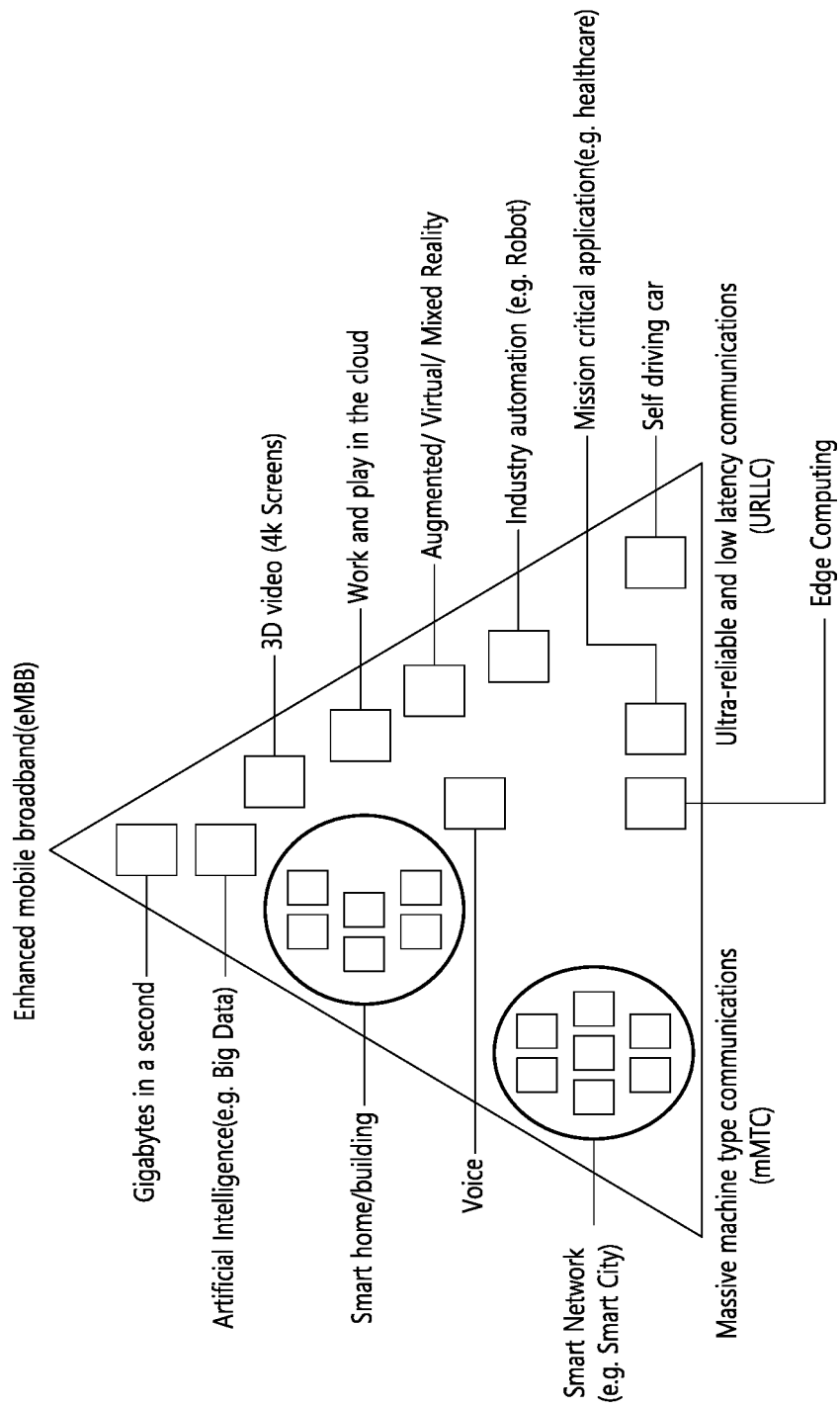
FIG. 1 shows examples of 5G usage scenarios to which the technical features of the present disclosure can be applied.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture, and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 2:
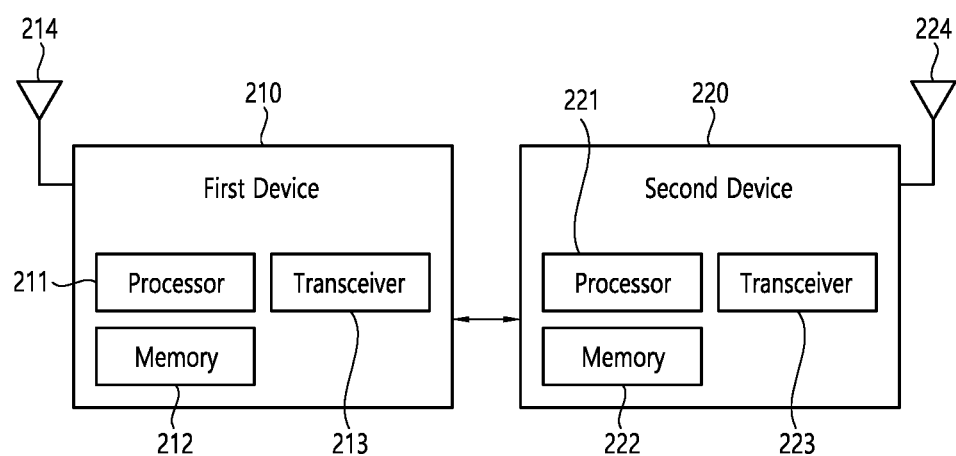
FIG. 2 shows an example of a wireless communication system to which the technical features of the present disclosure can be applied.

FIG. 2 shows an example of a wireless communication system to which the technical features of the present disclosure can be applied. Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present disclosure described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present disclosure described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 221, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
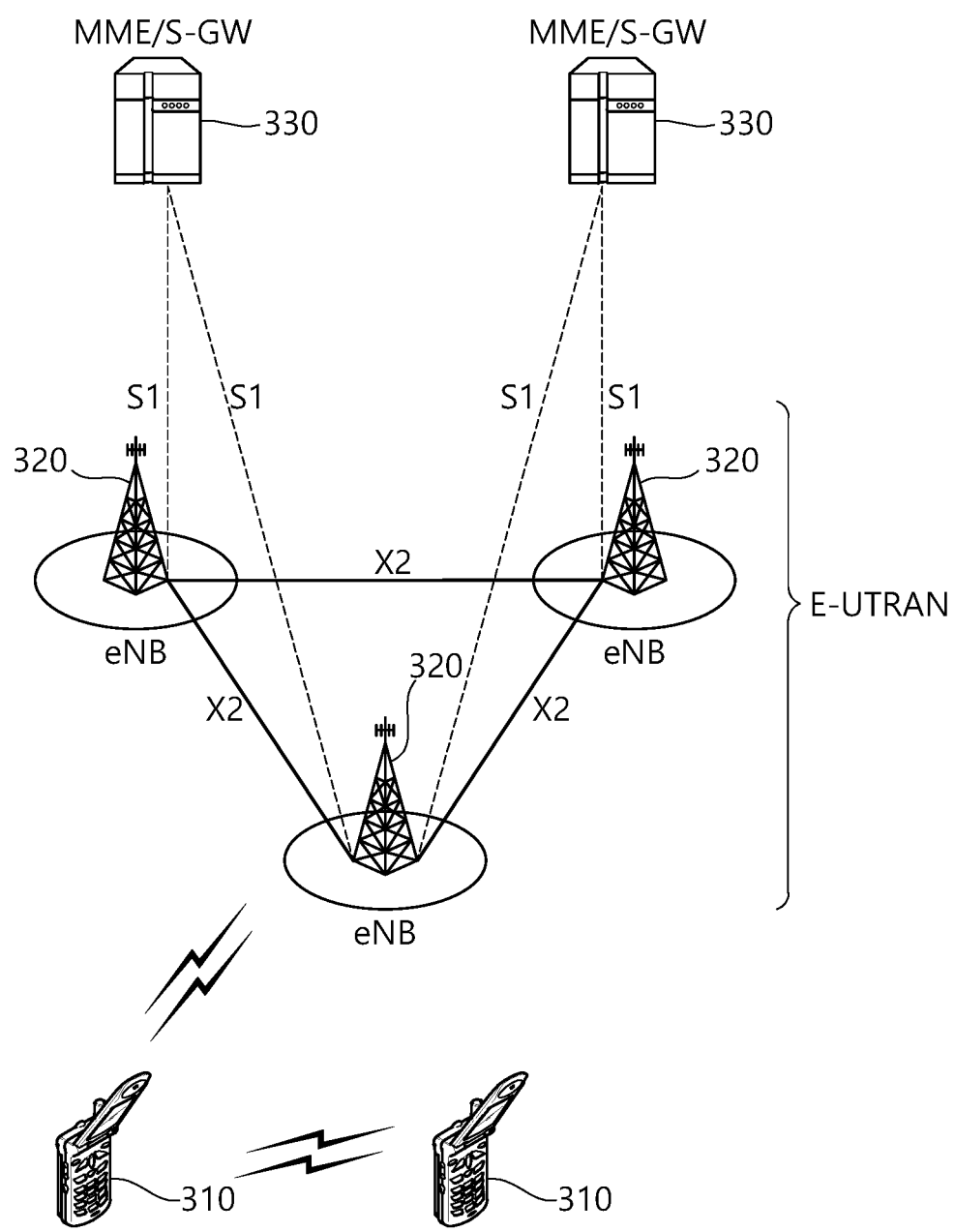
FIG. 3 shows another example of a wireless communication system to which the technical features of the present disclosure can be applied.

FIG. 3 shows another example of a wireless communication system to which the technical features of the present disclosure can be applied. Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), and a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMES/S-GWs and eNBs.

Figure 4:
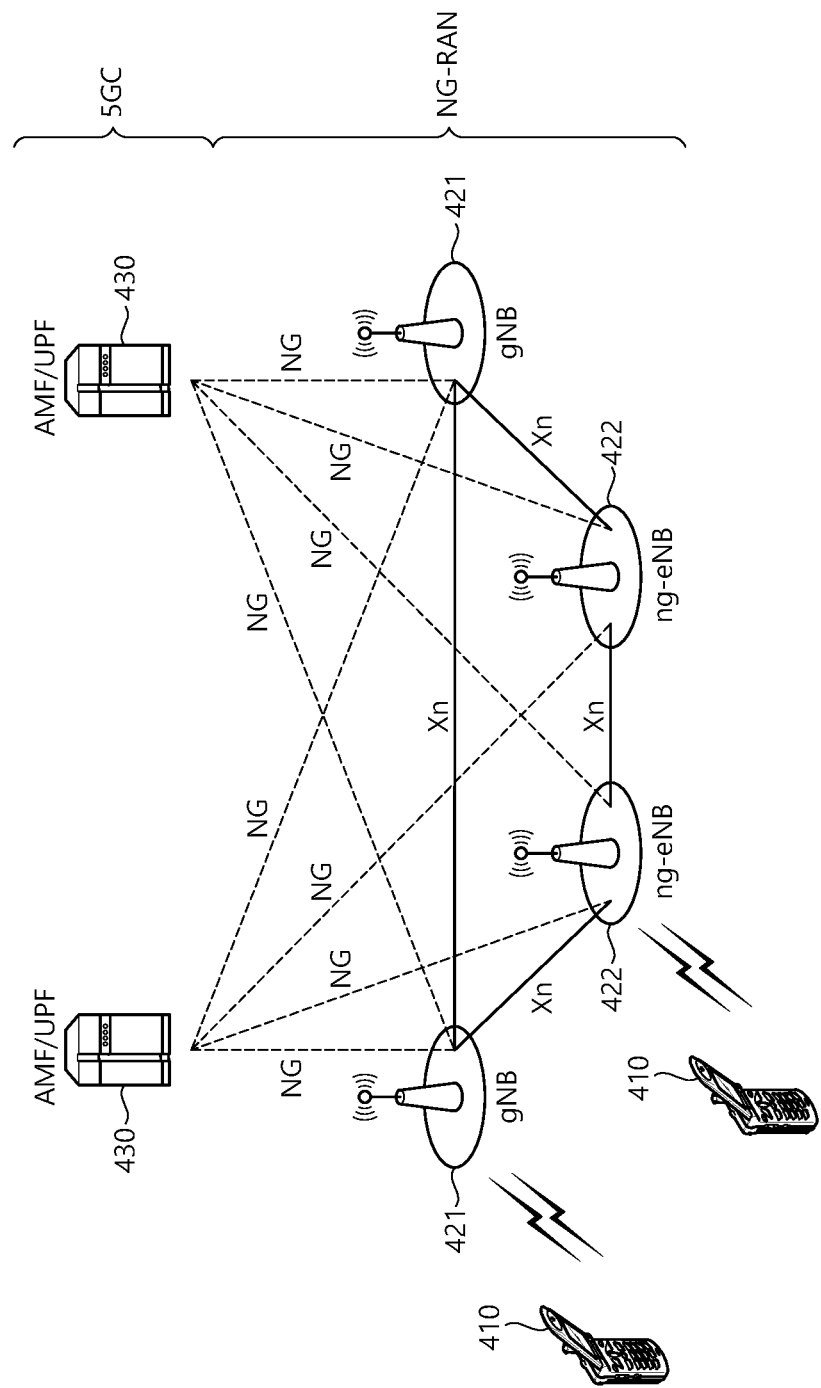
FIG. 4 shows another example of a wireless communication system to which the technical features of the present disclosure can be applied.

FIG. 4 shows another example of a wireless communication system to which the technical features of the present disclosure can be applied. Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
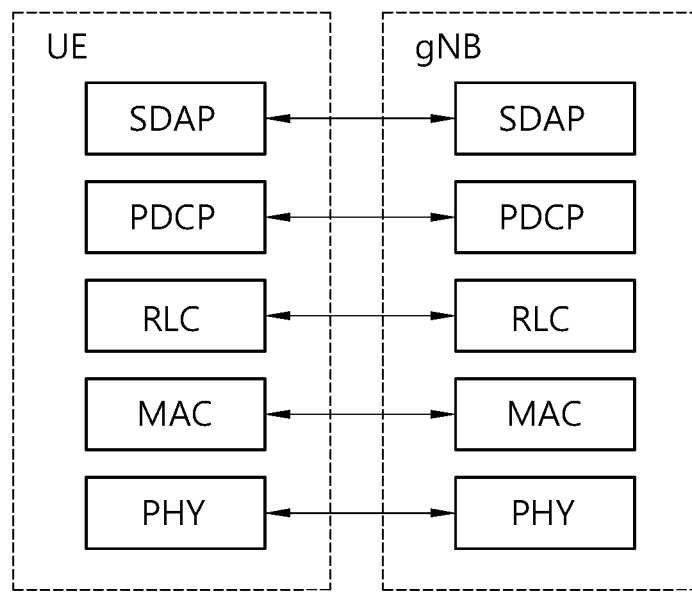
FIG. 5 shows a block diagram of a user plane protocol stack to which the technical features of the present disclosure can be applied.
Figure 6:
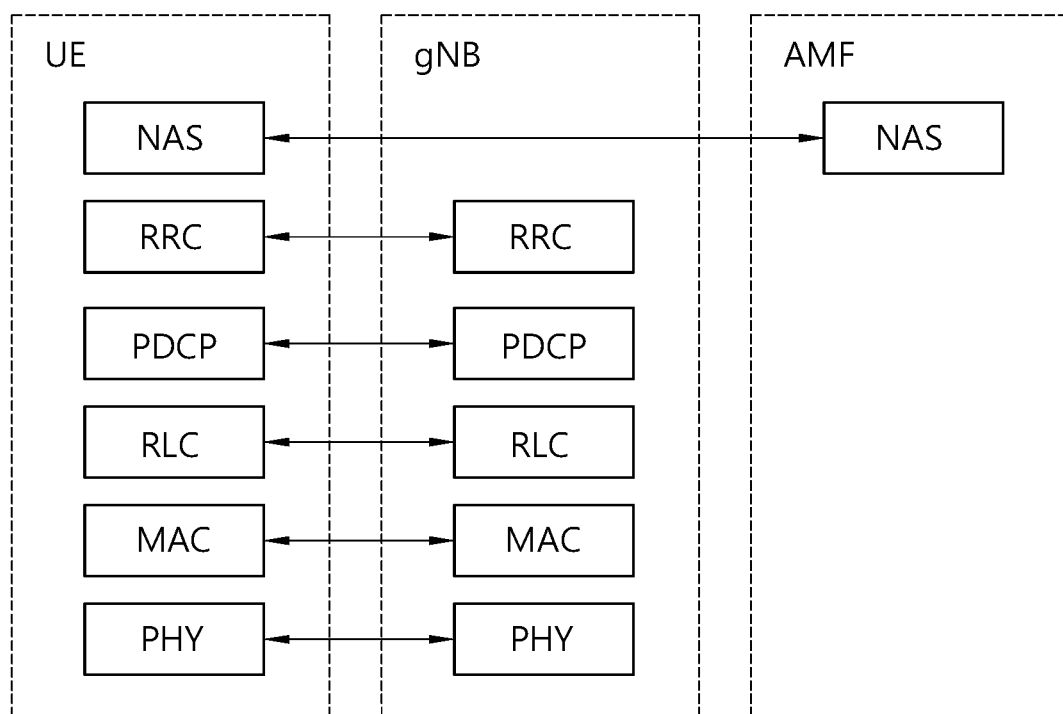
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied. The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARD), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Hereinafter, transport of NAS messages and early data transmission (EDT) are described. The following description of the RRC inactive state will be described by taking LTE-A as an example, but it can be applied to NR without loss of generality. For example, in the following description, eNB may be replaced with NG-RAN node/gNB and/or more generally BS, and MME may be replaced with AMF.

The AS provides reliable in-sequence delivery of NAS messages in a cell. During handover, message loss or duplication of NAS messages can occur.

In E-UTRAN, NAS messages are either concatenated with RRC messages or carried in RRC without concatenation. Upon arrival of concurrent NAS messages for the same UE requiring both concatenation with RRC for the high priority queue and also without concatenation for the lower priority queue, the messages are first queued as necessary to maintain in-sequence delivery.

In DL, when an EPS bearer establishment or release procedure is triggered, or for EDT, the NAS message should normally be concatenated with the associated RRC message. When the EPS bearer is modified and when the modification also depends on a modification of the radio bearer, the NAS message and associated RRC message should normally be concatenated. Concatenation of DL NAS with RRC message is not allowed otherwise. In UL concatenation of NAS messages with RRC message is used only for transferring the initial NAS message during connection setup and for EDT. Initial direct transfer is not used in E-UTRAN and no NAS message is concatenated with RRC connection request.

Multiple NAS messages can be sent in a single DL RRC message during EPS bearer establishment or modification. In this case, the order of the NAS messages in the RRC message shall be kept the same as that in the corresponding S1-AP message in order to ensure the in-sequence delivery of NAS messages.

NAS messages are integrity protected and ciphered by PDCP, in addition to the integrity protection and ciphering performed by NAS.

EDT allows one UL data transmission optionally followed by one DL data transmission during the random access procedure.

EDT is triggered when the upper layers have requested the establishment or resumption of the RRC connection for mobile originating (MO) data (i.e. not signaling or short message service (SMS)) and the UL data size is less than or equal to a transport block size (TBS) indicated in the system information. EDT is not used for data over the control plane when using the user plane cellular IoT (CIoT) EPS optimizations.

EDT may be only applicable to bandwidth reduced low complexity (BL) UEs, UEs in enhanced coverage and/or narrowband IoT (NB-IoT) UEs.

Mobile terminated (MT)-EDT may be triggered by a network. For example, a network transmits downlink (DL) data as NAS PDU via MT-EDT to a wireless device, during RACH procedure.

As described above, EDT is a mechanism for transmitting a small size of data without entering to a connected state. Therefore, the network may consider the size of the data before initiating the MT-EDT procedure.

However, there is no relevant procedures considering the size of the data for the MT-EDT procedure. Thus, studies for controlling EDT procedure based on the data size will be needed.

In addition, there are several MT-EDT options. One of the options is a DL data transmission after preamble.

Figure 7:
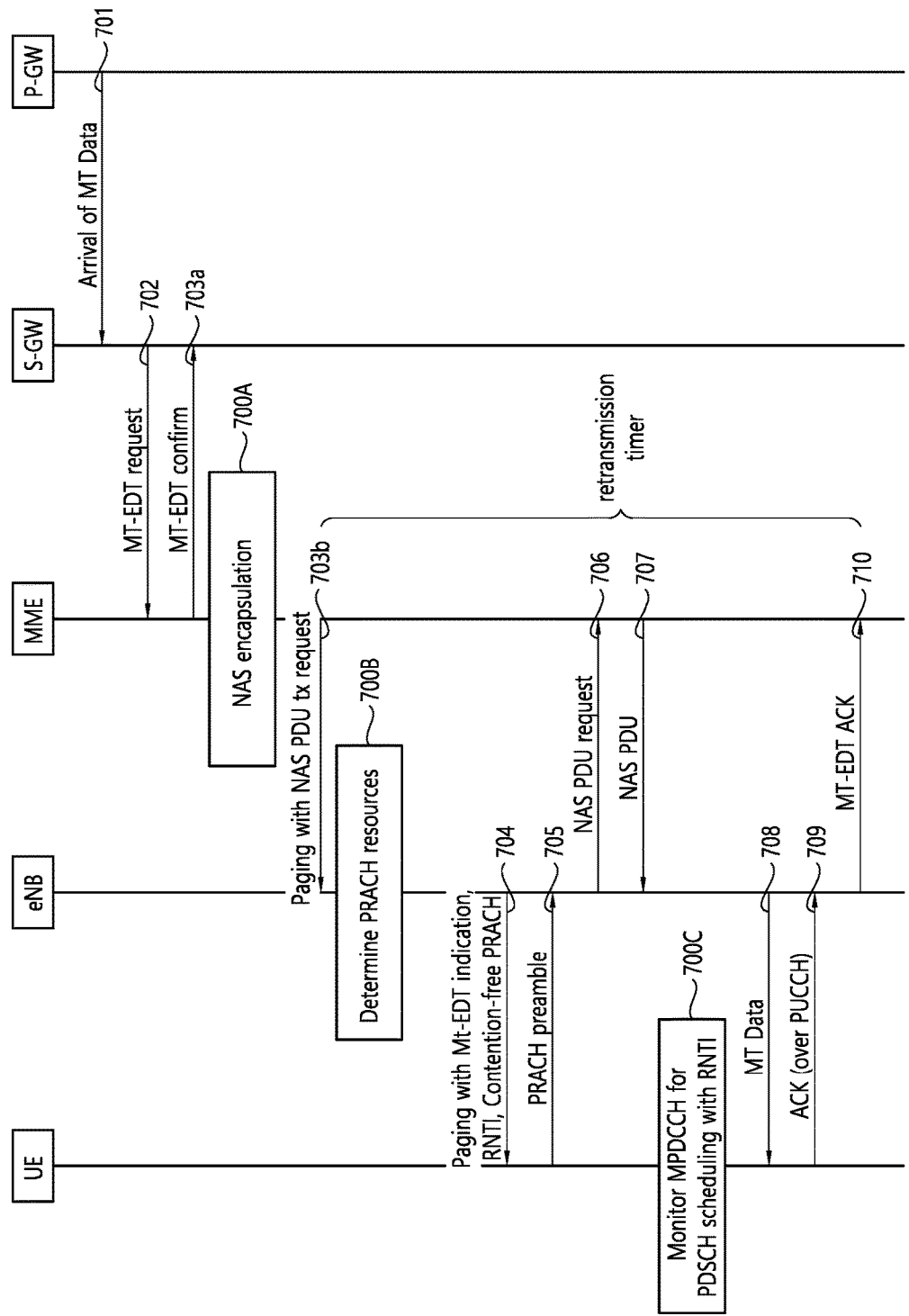
FIG. 7 shows an example option for MT-EDT procedure which the technical features of the present disclosure can be applied.

FIG. 7 shows an example option for MT-EDT procedure which the technical features of the present disclosure can be applied. In this scenario, a wireless device may receive an MT data from a network, after transmitting a RACH preamble to the network. In particular, upon receiving the dedicated preamble, the eNB may schedule the DL data.

In step 701, a packet data network (PDN)-gateway (P-GW) may transmit a signal informing arrival of MT data to a serving-gateway (S-GW).

In step 702, the S-GW may transmit MT-EDT request to a Mobility Management Entity (MME).

In step 703a, the S-GW may receive MT-EDT confirm from the MME.

In step 700A, the MMA may perform Non-Access Stratum (NAS) encapsulation.

In step 703b, the MME may transmit a paging with NAS PDU TX request to a evolve NodeB (eNB).

In step 700B, the eNB may determine Physical Random Access Channel (PRACH) resources. For example, the eNB may determine the PRACH resource upon receiving the panging.

In step 704, the eNB may transmit a paging with MT-EDT indication, radio network temporary identifier (RNTI), and information related to contention-free PRACH to a user equipment (UE).

In step 705, the UE may transmit a PRACH preamble to the eNB.

In step 706, the eNB may transmit a NAS PDU request to the MME.

In step 707, the eNB may receive a NAS PDU from the MME.

In step 700C, the UE may monitor machine-type communication (MTC) physical downlink control channel (MPDCCH) for physical downlink shared channel (PDSCH) scheduling with RNTI. For example, the UE may monitor the MPDCCH for PDSCH upon transmitting the PRACH preamble.

In step 708, the UE may receive MT data from the eNB. For example, the UE may receive the MT data by monitoring the MPDCCH for PDSCH.

In step 709, the UE may transmit an ACK over physical uplink control channel (PUCCH) to the eNB.

In step 710, the eNB may transmit a MT-EDT ACK to the MME.

For example, the MME may have a retransmission timer. The retransmission timer may start when the MME transmits the paging with NAS PDU TX request to the eNB. If the MME does not receive the MT-EDT ACK until the retransmission timer is expired, the MME may retransmit the paging with NAS PDU TX request to eNB.

However, the MT-EDT procedure described with reference to FIG. 7 does not consider the mobility case of a wireless device (for example, a UE). For example, a wireless device may move from an old radio access network (RAN) node (for example, an old eNB) to a new RAN node (for example, a new eNB) different from the old RAN node. In this case, the wireless device may leave the connected state with the old RAN node and enter to idle state with suspend with the old RAN node. The wireless device may attempt to enter connected state with the new RAN node because of movement of the wireless device.

When a wireless device accesses to a new RAN node, the new RAN node may not have the context (for example, UE context) of the wireless device to reactivate the AS security. Therefore, it is needed for the new RAN node to trigger the X2-AP Retrieve UE Context procedure to retrieve the UE context from the old RAN node. However, there is no relevant information to find the old RAN node in the preamble from the wireless device.

Therefore, it is needed to study new procedure to consider how the new RAN node finds the old RAN node where the RRC connection was suspended.

Hereinafter, some embodiments of methods for controlling EDT procedure according to the present disclosure will be described. In particular, some embodiments of methods for controlling EDT procedure based on the data size or for movement of a wireless device in a wireless communication system will be described. In addition, it is to be understood by those skilled in the art that the present disclosure includes combinations or variations of the following embodiments.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 8:
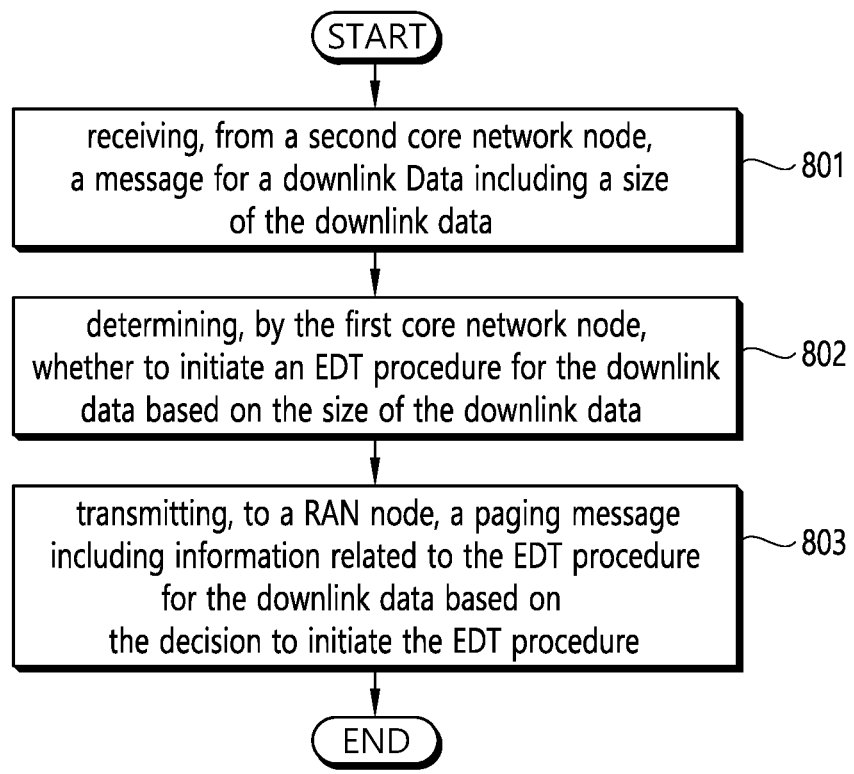
FIG. 8 shows an example of a method for controlling EDT procedure based on the data size in a wireless communication system according to some embodiments of the present disclosure.

FIG. 8 shows an example of a method for controlling EDT procedure based on the data size in a wireless communication system according to some embodiments of the present disclosure. The method may be performed by a first core network node in a wireless communication system.

In step 801, the first core network may receive, from a second core network node, a message for a downlink Data including a size of the downlink data. For example, the message may be a DL Data Notification message.

In step 802, the first core network may determine whether to initiate an early data transmission (EDT) procedure for the downlink data based on the size of the downlink data. For example, if the size of the downlink data is smaller than or equal to a transport block size (TB S) for the EDT procedure, the first core network may decide to initiate the EDT procedure. For other example, if the size of the downlink data is bigger than to the TBS for the EDT procedure, the first core network may decide not to initiate the EDT procedure.

In step 803, the first core network may transmit, to a radio access network (RAN) node, a paging message including information related to the EDT procedure for the downlink data based on the decision to initiate the EDT procedure. For example, the first core network may transmit the paging message to at least one of a RAN node included in a tracking area in which the wireless device is registered. In other words, the first core network node may transmit the paging message to all of RAN nodes included in a tracking area.

When a RAN node, included in the tracking area, receives the paging message from the first core network node, the RAN node may page the wireless device based on the information related to the EDT procedure. For example, the RAN node (or the RAN nodes in the tracking area) may transmit a paging or a paging message to the wireless device. The paging or the paging message may be generated based on the information received from the first core network node.

For example, the first core network may transmit, to the RAN node, a paging message including the size of the downlink data. The RAN node may recognize that the EDT procedure is initiated based on the size of the downlink data. The RAN node may transmit, to the wireless device, a paging or a paging message including an EDT indication or an MT-EDT indication.

For example, the first core network may transmit, to the RAN node, a paging message including the size of the downlink data. The RAN node may recognize that the EDT procedure is initiated based on the size of the downlink data. The RAN node may transmit, to the wireless device, a paging or a paging message including the size of the downlink data to inform the wireless device that the EDT procedure is initiated.

For example, the first core network may transmit, to the RAN node, a paging message including an EDT indication or an MT-EDT indication. The RAN node may recognize that the EDT procedure is initiated based on the EDT indication or the MT-EDT indication. The RAN node may transmit, to the wireless device, a paging or a paging message including the EDT indication or the MT-EDT indication.

According to some embodiment of the present disclosure, a first core network node may transmit a paging message further including information related to an old RAN node where the connection with the wireless device is suspended. For example, the information may include a Resume identity (ID) which is transmitted from the old RAN node during RRC connection suspend procedure performed before. The RAN node may be different from the old RAN node. The RAN node may perform a UE Context Retrieving procedure for the wireless device based on the information related to the old RAN node to perform the EDT procedure. For example, when the RAN node receives the paging message including the Resume ID, the RAN node could find the old RAN node by the Resume ID. The RAN node may transmit, to the old RAN node, a UE Context Retrieving Request message for the wireless device based on the Resume ID.

For example, during the suspending procedure for a connection between the wireless device and the old RAN node, the old RAN node may transmit, to a first core network node, a UE Context Suspend request message including a Resume ID. While the connection between the wireless device and a network is suspended, a new RAN node, different from the old RAN node, may receive, from a first core network node, a paging message including a Resume ID and information related to the EDT procedure. The new RAN node may transmit a paging or a paging message including the information related to the EDT procedure, to the wireless device.

The wireless device may recognize that the EDT procedure is initiated by the information related to the EDT procedure. The wireless device may transmit a random access channel (RACH) preamble to the new RAN node in response to the paging.

When the new RAN node may receive, from the wireless device, a RACH preamble, the new RAN node may determine that the wireless device is mapped to the Resume ID based on the RACH preamble. If the wireless device is mapped to the Resume ID, the RAN node may transmit a request for access information of the wireless device to the old RAN. For example, the new RAN node may transmit a X2-AP Retrieve UE Context Request to the old RAN.

When the old RAN node receives the request for access information of the wireless device, the old RAN node may decide whether to provide the access information to the new RAN node or not.

If the old RAN node decides to provide the access information to the new RAN node, the new RAN node may perform the EDT procedure to the wireless device using the access information. For example the old RAN node may release the access information of the wireless device.

If the old RAN node decides not to provide the access information to the new RAN node, the old RAN node may keep the access information and perform the EDT procedure to the wireless device via the new RAN node using the access information.

According to some embodiments of the present disclosure, the wireless communication system may be operated using 5G technologies. For example, the first core network node may be an access and mobility management function (AMF), the second core network node may be a user plane function (UPF), and the RAN node may be a next generation Node B (gNB). However, the present disclosure is not limited thereto.

According to some embodiments of the present disclosure, the wireless communication system may be operated using LTE and/or LTE-A technologies. For example, the first core network node may be a mobility management entity (MME), the second core network node may be a serving gateway (S-GW), and the RAN node may be an evolved Node B (eNB). However, the present disclosure is not limited thereto.

According to some embodiments of the present disclosure, the wireless device is an autonomous driving apparatus in communication with at least one of a mobile terminal, a network, and/or autonomous vehicles other than the wireless device.

Hereinafter, some embodiments for controlling EDT procedure in a wireless communication system according to the present disclosure will be described. The features described above with reference to FIG. 8 may be applied to the following embodiments.

Figure 9:
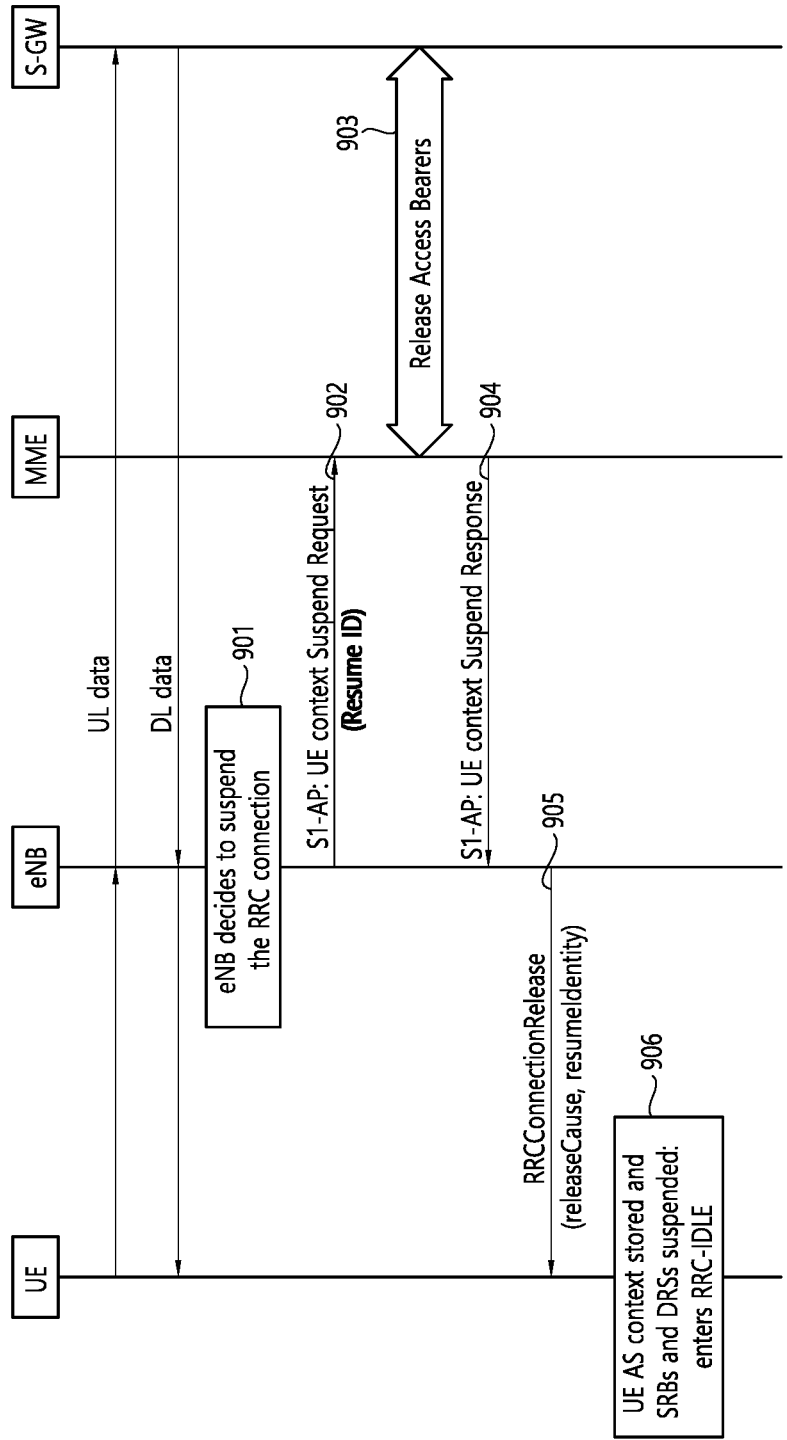
FIG. 9 shows an example method for controlling EDT procedure in a wireless communication system, according to some embodiment of the present disclosure.

FIG. 9 shows an example method for controlling EDT procedure in a wireless communication system, according to some embodiment of the present disclosure. In particular, the method may be performed as a RRC Connection Suspend procedure considering MT-EDT.

The method may include that the eNB sends the Resume ID to the MME. The method may further include that the MME stores the Resume ID and forwards it to the eNB when the S1AP Paging is triggered for the MT EDT.

In step 901, due to some triggers (for example, the expiry of a UE inactivity timer), the eNB may decide to suspend the RRC connection with a UE.

In step 902, the eNB may initiate the S1-AP UE Context Suspend procedure to inform the MME that the RRC connection is being suspended. For example, the eNB may transmit S1-AP UE Context Suspend Request message including a Resume ID to the MME. The Resume ID may be sent to the MME for the support of UE mobility for the MT EDT. The MME may store the Resume ID and forward the Resume ID to the eNB when the S1AP Paging is triggered for the MT EDT.

For example, instead of the Resume ID, a new ID can be allocated by the eNB to identify the UE context.

In step 903, the MME may request the S-GW to release all S1-U bearers for the UE.

In step 904, the MME may ack in response to the UE Context Suspend Request including the Resume ID transmitted at step 902. For example, the MME may transmit, to the eNB, a S1-AP UE Context Suspend Response message.

In step 905, the eNB may suspend the RRC connection by sending an RRCConnectionRelease message with the releaseCause set to rrc-Suspend. The RRCConnectionRelease message may include the Resume ID. The Resume ID may be stored by the UE.

In step 906, the UE may store the AS context, suspend all SRBs and DRBs, and enter RRC_IDLE.

Figure 10:
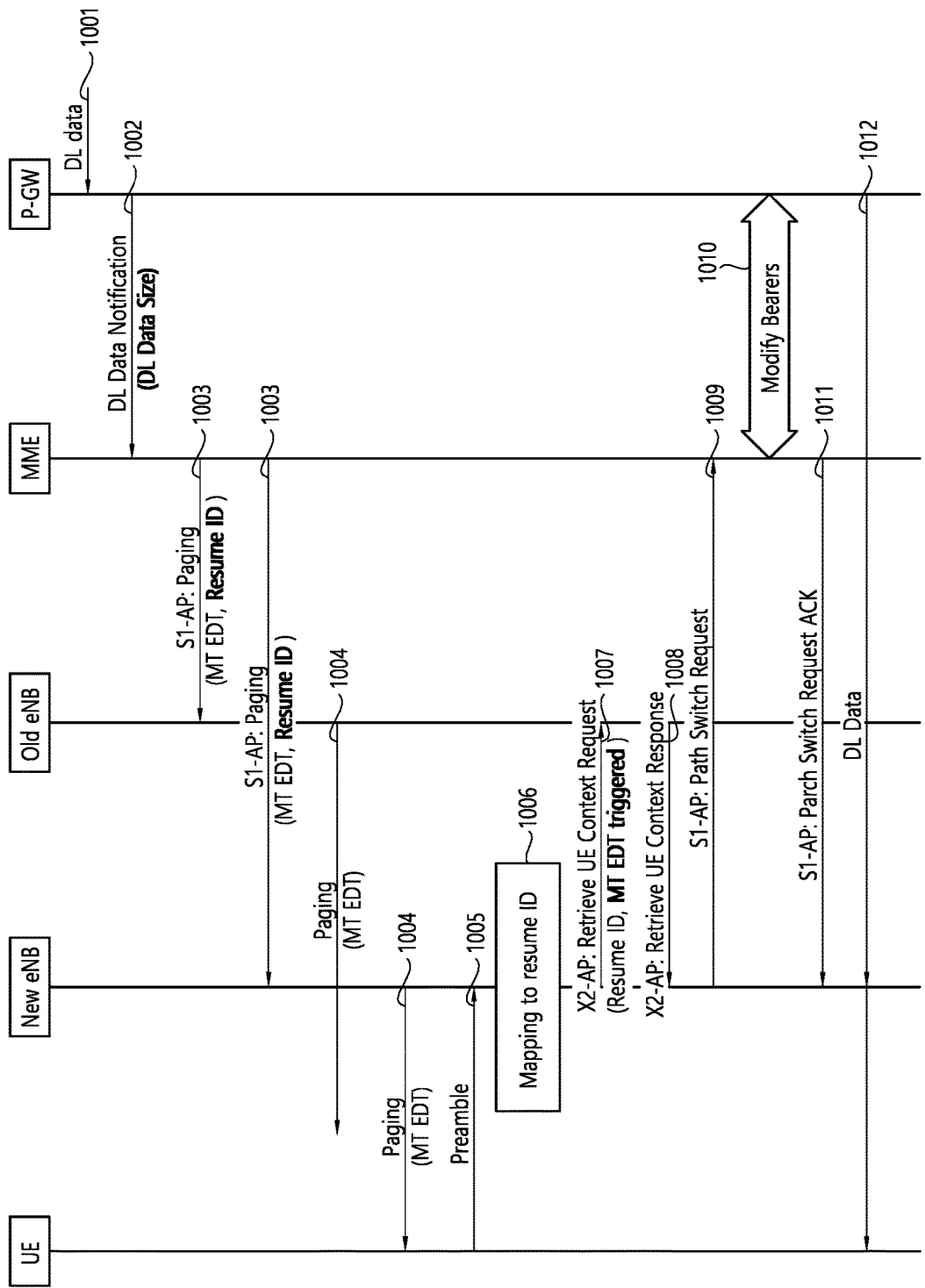
FIG. 10 shows an example method for controlling EDT procedure in a wireless communication system, according to some embodiment of the present disclosure.

FIG. 10 shows an example method for controlling EDT procedure in a wireless communication system, according to some embodiment of the present disclosure. In particular, FIG. 10 shows an example method of MT EDT for UP Optimizations in different eNB with relocation for UE context. In this example, the MME may store the Resume ID for the support of UE mobility for the MT EDT. For example, steps in FIG. 9 may be performed already.

In the method, the S-GW may transmit DL Data Notification including the size of the DL data. The MME may determine whether to initiate the MT EDT procedure or not. If the MME decide to trigger the MT EDT procedure, the MME may send, to at least one of the eNBs in the tracking area, the S1AP Paging message including the Resume ID and an information related to the MT EDT procedure (for example, MT EDT indication or the size of the DL data). The Resume ID maybe used for the new eNB to find old eNB where the connection was suspended. The new eNB may request the UE context over X2 interface to the old eNB. The new eNB may indicate to the old eNB that this access is triggered for the MT EDT. The old eNB could decide whether to keep the UE context or not.

At first, the UE and the old eNB may suspend the RRC connection.

In step 1001, the S-GW may receive DL data.

In step 1002, the S-GW may send a message to the MME. The message may include the size for the downlink data. The message may be a DL Data Notification message.

In step 1003, the MME may decide to initiate the early data transmission procedure for the MT data based on the expected UE behavior and the downlink data size received in step 1002.

If the MME decides to initiate the MT EDT procedure, the MME may send the S1AP Paging message including the Resume ID and an information related to the MT EDT procedure (for example, MT EDT indication or the size of the DL data) to each eNB belonging to the tracking area(s) in which the UE is registered.

The information related to the MT EDT procedure (for example, MT EDT indication or the size of the DL data) may be used to indicate to the eNB and the UE that the MT EDT is triggered.

The Resume ID may be used for the new eNB to retrieve the UE context from the old eNB over the X2 interface. For example, an eNB (the new eNB), which is different from the one where the connection was suspended (the old eNB), may use the resume ID to retrieve the UE context from the old eNB.

According to some embodiments of the present disclosure, a new ID may be used instead of the Resume ID. If the new ID is allocated by the eNB instead of the Resume ID during the suspend procedure described with reference to the FIG. 9, the new ID may be used for the procedure in FIG. 10.

In step 1004, if the eNBs receive paging messages from the MME, the UE may be paged by the eNBs. If the information related to the MT EDT procedure is included into the S1AP Paging message, the eNB may also include same or different information related to the MT EDT procedure to the Paging message. For example, the information included in the paging from the eNB may indicate that MT EDT is triggered. For example, the information included in the paging from the eNB may include the size of DL data.

In step 1005, the UE may be paged in an eNB (the new eNB) different from the one where the connection was suspended (the old eNB). The UE may select a random access (RA) preamble configured for EDT and send the RA preamble to the new eNB. The UE may send a new message containing the UE ID and security key to re-establish the AS security and to access the stored information for the UE, instead of the existing RA preamble.

In step 1006, on receiving the preamble from the UE, the new eNB may check whether it is able to find the UE context or not. If not, the new eNB may map the UE identity onto the resume ID received in step 1003.

When the UE sends a new message containing the UE ID and security key in step 1005 instead of the preamble, the new eNB can use this information to decide which eNB has the stored context for the UE.

In step 1007, the new eNB may find the old eNB using the Resume ID and retrieve the UE context by means of the X2-AP Retrieve UE Context procedure. The new eNB may indicate the UE access for the MT EDT to the old eNB by using the "MT EDT triggered" indication.

In step 1008, the old eNB may respond with the UE context associated with the Resume ID.

In step 1009, the new eNB may initiate the S1-AP Path Switch procedure to establish a S1 UE associated signalling connection to the serving MME and to request the MME to resume the UE context. For example, the new eNB may transmit a S1-AP Path Switch Request to the MME.

In step 1010, the MME may request the S-GW to activate the S1-U bearers for the UE and updates the downlink path.

In step 1011, the MME may at least one of acknowledgements to the new eNB in response to the S1-AP Path Switch Request received from step 1009. For example, the MME may transmit the S1-AP Path Switch Response to the new eNB.

In step 1012, the downlink data may be sent to the UE via the new eNB.

Figure 11:
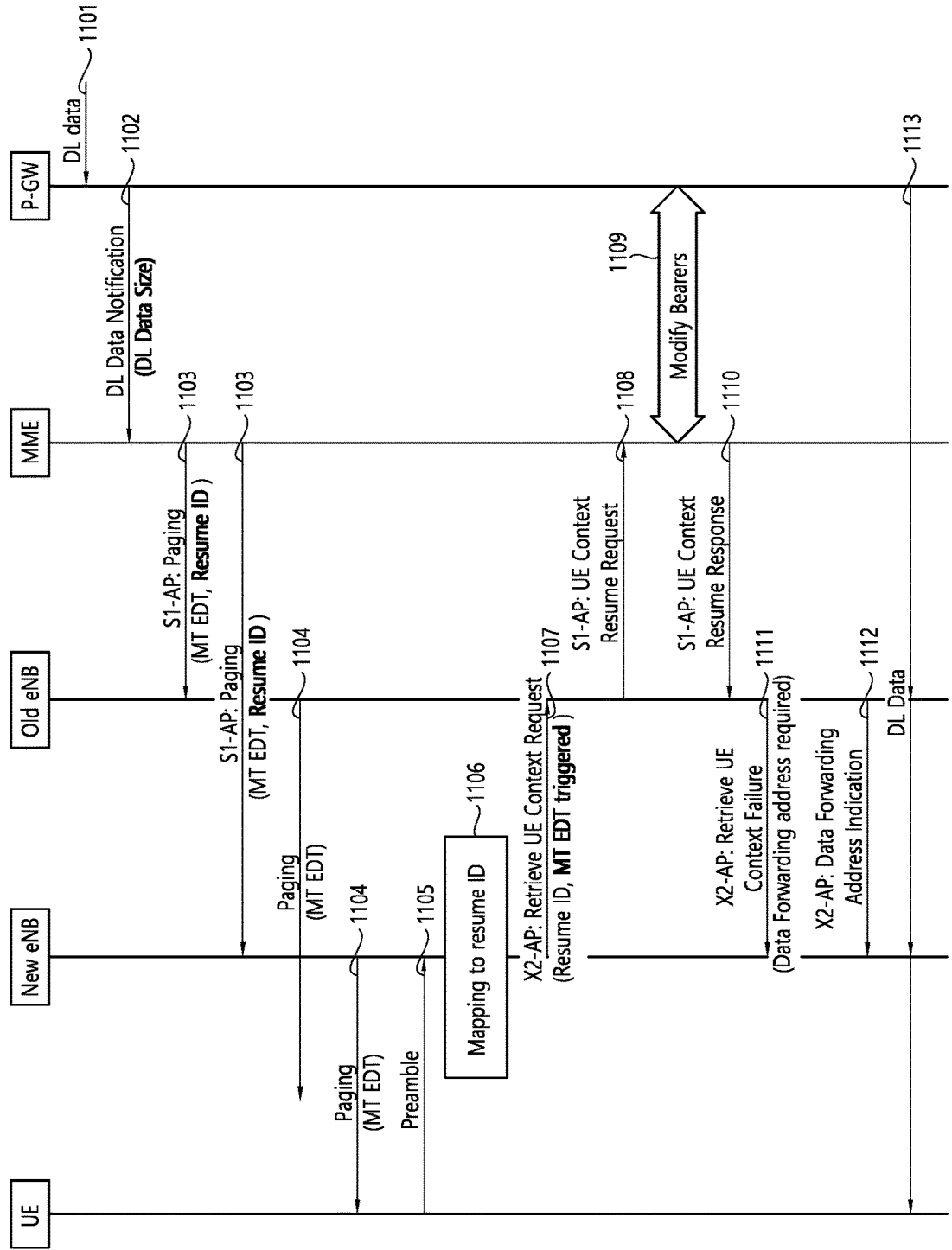
FIG. 11 shows an example method for controlling EDT procedure in a wireless communication system, according to some embodiment of the present disclosure.

FIG. 11 shows an example method for controlling EDT procedure in a wireless communication system, according to some embodiment of the present disclosure. In particular, FIG. 11 shows an example method of MT EDT for UP Optimizations in different eNB with no relocation for UE context. In this example, the MME may store the Resume ID for supporting a mobility of a wireless device for the MT EDT. For example, steps in FIG. 9 may be performed already.

In the method, the S-GW may transmit DL Data Notification including the size of the DL data. The MME may determine whether to initiate the MT EDT procedure or not. If the MME decide to trigger the MT EDT procedure, the MME may send, to at least one of the eNBs in the tracking area, the S1AP Paging message including the Resume ID and an information related to the MT EDT procedure (for example, MT EDT indication or the size of the DL data). The Resume ID maybe used for the new eNB to find old eNB where the connection was suspended.

In addition, when the new eNB requests the UE context over X2 interface to the old eNB, the new eNB may indicate to the old eNB that this access is triggered for the MT EDT. The old eNB could decide whether to keep the UE context or not.

At first, the UE and the old eNB may suspend the RRC connection.

In step 1101, the S-GW may receive DL data.

In step 1102, the S-GW may send a message including the size of the downlink data to the MME. The message may be a DL Data Notification message.

In step 1103, the MME may decide to initiate the early data transmission procedure for the MT data based on the expected UE behavior and the downlink data size received in step 1002.

If the MME decides to initiate the MT EDT procedure, the MME may send the S1AP Paging message including the Resume ID and an information related to the MT EDT procedure (for example, MT EDT indication or the size of the DL data) to each eNB belonging to the tracking area(s) in which the UE is registered.

The an information related to the MT EDT procedure (for example, MT EDT indication or the size of the DL data) may be used to indicate to the eNB and the UE that the MT EDT is triggered.

The Resume ID may be used for the new eNB to retrieve the UE context from the old eNB over the X2 interface. For example, an eNB (the new eNB), which is different from the one where the connection was suspended (the old eNB), may use the resume ID to retrieve the UE context from the old eNB.

According to some embodiments of the present disclosure, a new ID may be used instead of the Resume ID. If the new ID is allocated by the eNB instead of the Resume ID during the suspend procedure described with reference to the FIG. 9, the new ID may be used for the procedure in FIG. 11.

In step 1104, if the eNBs receive paging messages from the MME, the UE may be paged by the eNBs. If the information related to the MT EDT procedure is included into the S1AP Paging message, the eNB may also include same or different information related to the MT EDT procedure to the Paging message. For example, the information included in the paging from the eNB may indicate that MT EDT is triggered. For example, the information included in the paging from the eNB may include the size of DL data.

In step 1105, the UE may be paged in an eNB (the new eNB) different from the one where the connection was suspended (the old eNB). The UE may select a random access (RA) preamble configured for EDT and send the RA preamble to the new eNB. The UE may send a new message containing the UE ID and security key to re-establish the AS security and to access the stored information for the UE, instead of the existing RA preamble.

In step 1106, on receiving the preamble from the UE, the new eNB may check whether it is able to find the UE context or not. If not, the new eNB may map the UE identity onto the resume ID received in step 1103.

When the UE sends a new message containing the UE ID and security key in step 1105 instead of the preamble, the new eNB can use this information to decide which eNB has the stored context for the UE.

In step 1107, the new eNB may find the old eNB using the Resume ID and retrieve the UE context by means of the X2-AP Retrieve UE Context procedure. The new eNB may indicate the UE access for the MT EDT to the old eNB by using the "MT EDT triggered" indication.

In step 1108, if the old eNB wants to keep the UE context, the old eNB may initiate the S1-AP Context Resume procedure to notify the MME about the UE state change. For example, the old eNB may transmit a S1-AP Context Resume Request to the MME.

In step 1109, the MME may request the S-GW to activate the S1-U bearers for the UE.

In step 1110, the MME may at least one of acknowledgements to the old eNB in response to the S1-AP Context Resume Request received from step 1108. For example, the MME may transmit the S1-AP Context Resume Response to the new eNB.

In step 1111, when the old eNB decides not to provide the UE context to the new eNB, the old eNB may transmit, to the new eNB, the X2AP Retrieve UE Context Failure message including the "Data forwarding address required" indication.

In step 1112, based on the "Data forwarding address required" indication, the new eNB may provide forwarding addresses to the old eNB. For example, the new eNB may transmit a X2-AP Data Forwarding Address Indication to the old eNB.

In step 1113, the downlink data may be sent to the UE via the old eNB and the new eNB.

In this example, since the old RAN node does not need to relocate the UE context to the new RAN node, when a wireless device moves back to the old eNB, the wireless device could quickly resume the RRC connection with the old RAN node.

According to some embodiments of the present disclosure, RAN nodes in the tracking area may recognize that EDT procedure for a wireless device is triggered by receiving an information related to the EDT procedure. Therefore, the RAN node may control EDT procedure efficiently.

In addition, based on the information (for example, a Resume ID) including the paging message from the core network node, the new RAN node may find the old RAN node where connection with the wireless device is suspended. Therefore, the loss of DL data could be prevented and unnecessary latency due to the data retransmission could be reduced. Furthermore, it could make experience of the wireless device better.

According to some embodiments of the present disclosure, the methods described above with reference to the FIGS. 8 to 11 may be applied to early data transmission in the NB-IoT UE and RRC-INACTIVE UE.

According to some embodiment of the present disclosure, a first core network node in in a wireless communication system described above with reference to the FIGS. 8 to 11 may include a memory, a transceiver, and a processor, operably coupled to the memory and the transceiver.

For example, the processor may control the transceiver to receive, from a second core network node, a message (for example, a DL Data Notification message) for a downlink Data including a size of the downlink data. The processor may determine whether to initiate an early data transmission (EDT) procedure for the downlink data based on the size of the downlink data. The processor may control the transceiver to transmit, to a radio access network (RAN) node, a paging message including information related to the EDT procedure for the downlink data based on the decision to initiate the EDT procedure for a wireless device.

According to some embodiment of the present disclosure, the technical features of the present disclosure could be embodied directly in hardware, in a software executed by a processor, or in a combination of the two. For example, a method performed by a first core network node in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium. Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium. For example, computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to carry or store instructions or data structures. Computer-readable media may also include combinations of the above. In addition, the method described herein may be realized at least in part by a computer-readable communication medium that carries or communicates code in the form of instructions or data structures and that can be accessed, read, and/or executed by a computer.

Figure 12:
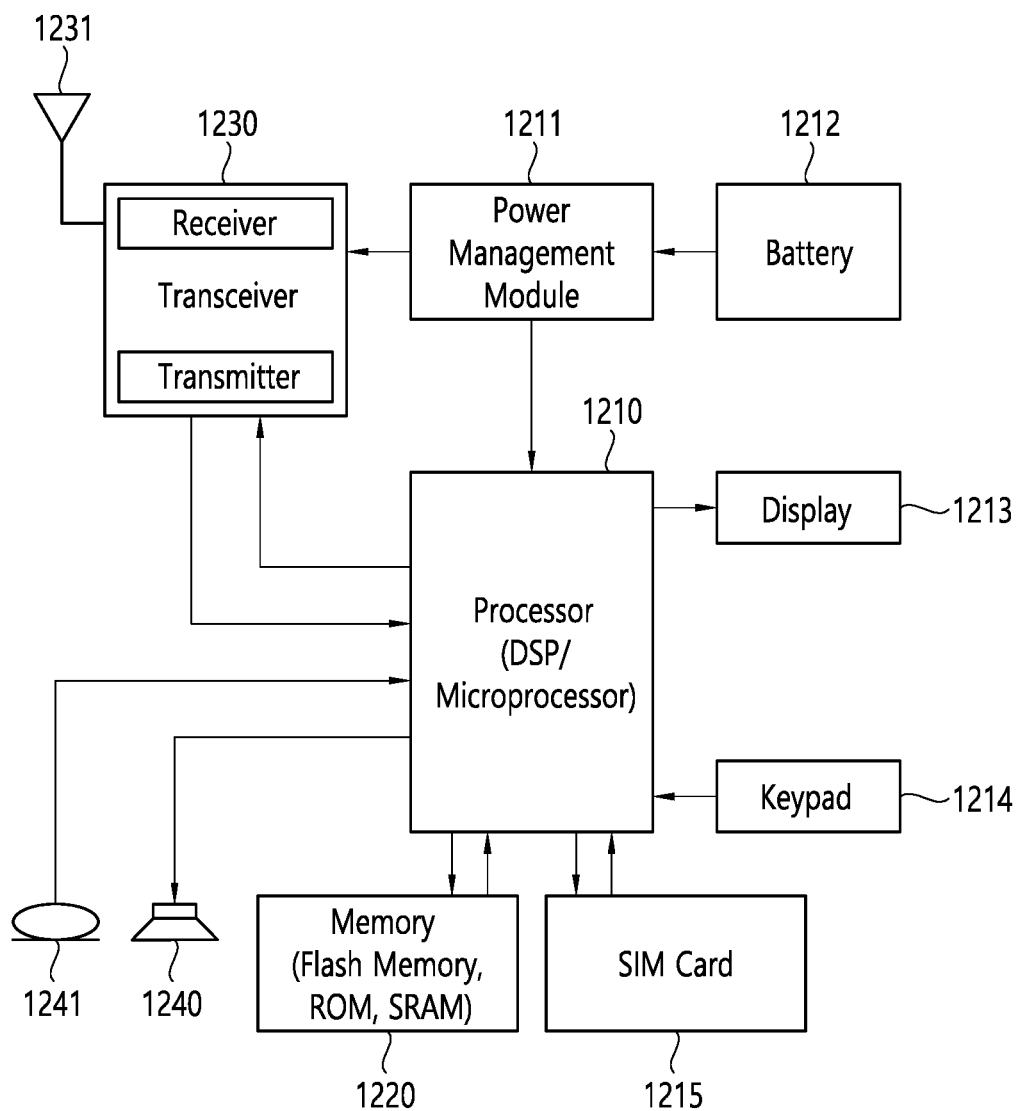
FIG. 12 shows an apparatus to which the technical features of the present disclosure can be applied.

FIG. 12 shows an apparatus to which the technical features of the present disclosure can be applied. The detailed description of the same features as those described above will be simplified or omitted.

An apparatus may be referred to as a wireless device, such as a user equipment (UE), an Integrated Access and Backhaul (IAB), or etc.

A wireless device includes a processor 1210, a power management module 1211, a battery 1212, a display 1213, a keypad 1214, a subscriber identification module (SIM) card 1215, a memory 1220, a transceiver 1230, one or more antennas 1231, a speaker 1240, and a microphone 1241.

The processor 1210 may be configured to implement proposed functions, procedures and/or methods described in this description. Layers of the radio interface protocol may be implemented in the processor 1210. The processor 1210 may include application-specific integrated circuit (ASIC), other chipset, logic circuit and/or data processing device. The processor 1210 may be an application processor (AP). The processor 1210 may include at least one of a digital signal processor (DSP), a central processing unit (CPU), a graphics processing unit (GPU), a modem (modulator and demodulator). An example of the processor 1210 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The power management module 1211 manages power for the processor 1210 and/or the transceiver 1230. The battery 1212 supplies power to the power management module 1211. The display 1213 outputs results processed by the processor 1210. The keypad 1214 receives inputs to be used by the processor 1210. The keypad 1214 may be shown on the display 1213. The SIM card 1215 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1220 is operatively coupled with the processor 1210 and stores a variety of information to operate the processor 1210. The memory 1220 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1220 and executed by the processor 1210. The memory 1220 can be implemented within the processor 1210 or external to the processor 1210 in which case those can be communicatively coupled to the processor 1210 via various means as is known in the art.

The transceiver 1230 is operatively coupled with the processor 1210, and transmits and/or receives a radio signal. The transceiver 1230 includes a transmitter and a receiver. The transceiver 1230 may include baseband circuitry to process radio frequency signals. The transceiver 1230 controls the one or more antennas 1231 to transmit and/or receive a radio signal.

The speaker 1240 outputs sound-related results processed by the processor 1210. The microphone 1241 receives sound-related inputs to be used by the processor 1210.

The present disclosure may be applied to various future technologies, such as AI, robots, autonomous-driving/self-driving vehicles, and/or extended reality (XR).

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

<Robot>

A robot can mean a machine that automatically processes or operates a given task by its own abilities. In particular, a robot having a function of recognizing the environment and performing self-determination and operation can be referred to as an intelligent robot. Robots can be classified into industrial, medical, household, military, etc., depending on the purpose and field of use. The robot may include a driving unit including an actuator and/or a motor to perform various physical operations such as moving a robot joint. In addition, the movable robot may include a wheel, a break, a propeller, etc., in a driving unit, and can travel on the ground or fly in the air through the driving unit.

<Autonomous-Driving/Self-Driving>

The autonomous-driving refers to a technique of self-driving, and an autonomous vehicle refers to a vehicle that travels without a user's operation or with a minimum operation of a user. For example, autonomous-driving may include techniques for maintaining a lane while driving, techniques for automatically controlling speed such as adaptive cruise control, techniques for automatically traveling along a predetermined route, and techniques for traveling by setting a route automatically when a destination is set. The autonomous vehicle may include a vehicle having only an internal combustion engine, a hybrid vehicle having an internal combustion engine and an electric motor together, and an electric vehicle having only an electric motor, and may include not only an automobile but also a train, a motorcycle, etc. The autonomous vehicle can be regarded as a robot having an autonomous driving function.

<XR>

XR are collectively referred to as VR, AR, and MR. VR technology provides real-world objects and/or backgrounds only as computer graphic (CG) images, AR technology provides CG images that is virtually created on real object images, and MR technology is a computer graphics technology that mixes and combines virtual objects in the real world. MR technology is similar to AR technology in that it shows real and virtual objects together. However, in the AR technology, the virtual object is used as a complement to the real object, whereas in the MR technology, the virtual object and the real object are used in an equal manner. XR technology can be applied to HMD, head-up display (HUD), mobile phone, tablet PC, laptop, desktop, TV, digital signage. A device to which the XR technology is applied may be referred to as an XR device.

Figure 13:
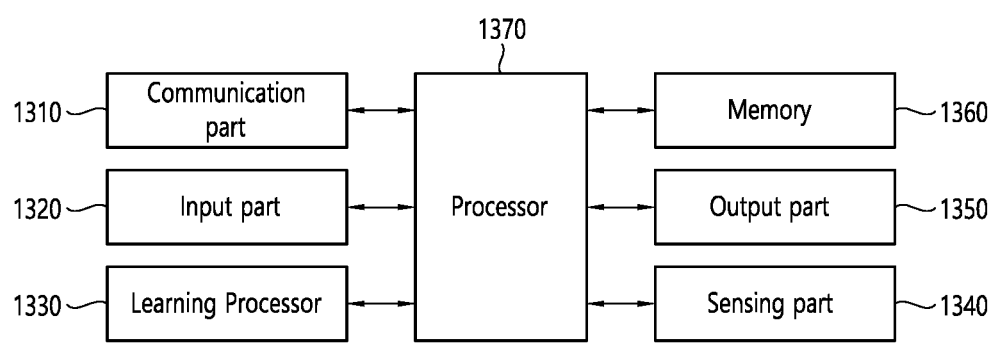
FIG. 13 shows an example of an AI device to which the technical features of the present disclosure can be applied.

FIG. 13 shows an example of an AI device to which the technical features of the present disclosure can be applied.

The AI device 1300 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 13, the AI device 1300 may include a communication part 1310, an input part 1320, a learning processor 1330, a sensing part 1340, an output part 1350, a memory 1360, and a processor 1370.

The communication part 1310 can transmit and/or receive data to and/or from external devices such as the AI devices and the AI server using wire and/or wireless communication technology. For example, the communication part 1310 can transmit and/or receive sensor information, a user input, a learning model, and a control signal with external devices. The communication technology used by the communication part 1310 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1320 can acquire various kinds of data. The input part 1320 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1320 can acquire input data to be used when acquiring an output using learning data and a learning model for model learning. The input part 1320 may obtain raw input data, in which case the processor 1370 or the learning processor 1330 may extract input features by preprocessing the input data.

The learning processor 1330 may learn a model composed of an ANN using learning data. The learned ANN can be referred to as a learning model. The learning model can be used to infer result values for new input data rather than learning data, and the inferred values can be used as a basis for determining which actions to perform. The learning processor 1330 may perform AI processing together with the learning processor of the AI server. The learning processor 1330 may include a memory integrated and/or implemented in the AI device 1300. Alternatively, the learning processor 1330 may be implemented using the memory 1360, an external memory directly coupled to the AI device 1300, and/or a memory maintained in an external device.

The sensing part 1340 may acquire at least one of internal information of the AI device 1300, environment information of the AI device 1300, and/or the user information using various sensors. The sensors included in the sensing part 1340 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1350 may generate an output related to visual, auditory, tactile, etc. The output part 1350 may include a display for outputting visual information, a speaker for outputting auditory information, and/or a haptic module for outputting tactile information.

The memory 1360 may store data that supports various functions of the AI device 1300. For example, the memory 1360 may store input data acquired by the input part 1320, learning data, a learning model, a learning history, etc.

The processor 1370 may determine at least one executable operation of the AI device 1300 based on information determined and/or generated using a data analysis algorithm and/or a machine learning algorithm. The processor 1370 may then control the components of the AI device 1300 to perform the determined operation. The processor 1370 may request, retrieve, receive, and/or utilize data in the learning processor 1330 and/or the memory 1360, and may control the components of the AI device 1300 to execute the predicted operation and/or the operation determined to be desirable among the at least one executable operation. The processor 1370 may generate a control signal for controlling the external device, and may transmit the generated control signal to the external device, when the external device needs to be linked to perform the determined operation. The processor 1370 may obtain the intention information for the user input and determine the user's requirements based on the obtained intention information. The processor 1370 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1330 and/or learned by the learning processor of the AI server, and/or learned by their distributed processing. The processor 1370 may collect history information including the operation contents of the AI device 1300 and/or the user's feedback on the operation, etc. The processor 1370 may store the collected history information in the memory 1360 and/or the learning processor 1330, and/or transmit to an external device such as the AI server. The collected history information can be used to update the learning model. The processor 1370 may control at least some of the components of AI device 1300 to drive an application program stored in memory 1360. Furthermore, the processor 1370 may operate two or more of the components included in the AI device 1300 in combination with each other for driving the application program.

Figure 14:
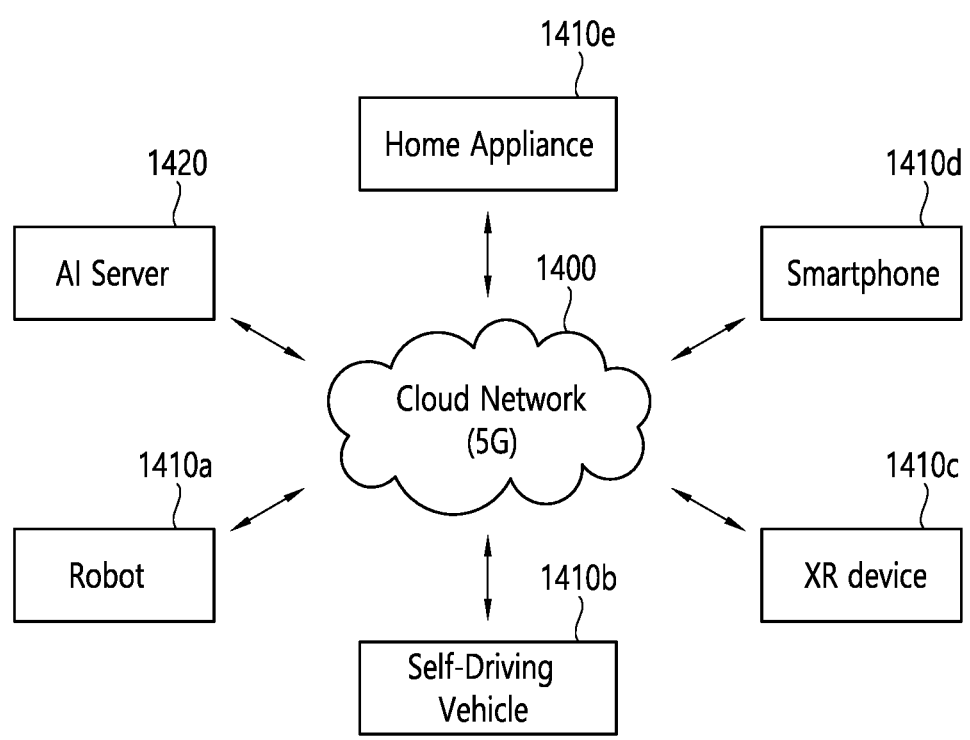
FIG. 14 shows an example of an AI system to which the technical features of the present disclosure can be applied.

FIG. 14 shows an example of an AI system to which the technical features of the present disclosure can be applied.

Referring to FIG. 14, in the AI system, at least one of an AI server 1420, a robot 1410*a*, an autonomous vehicle 1410*b*, an XR device 1410*c*, a smartphone 1410*d* and/or a home appliance 1410*e* is connected to a cloud network 1400. The robot 1410*a*, the autonomous vehicle 1410*b*, the XR device 1410*c*, the smartphone 1410*d*, and/or the home appliance 1410*e* to which the AI technology is applied may be referred to as AI devices 1410*a* to 1410*e*.

The cloud network 1400 may refer to a network that forms part of a cloud computing infrastructure and/or resides in a cloud computing infrastructure. The cloud network 1400 may be configured using a 3G network, a 4G or LTE network, and/or a 5G network. That is, each of the devices 1410*a* to 1410*e* and 1420 consisting the AI system may be connected to each other through the cloud network 1400. In particular, each of the devices 1410*a* to 1410*e* and 1420 may communicate with each other through a base station, but may directly communicate with each other without using a base station.

The AI server 1420 may include a server for performing AI processing and a server for performing operations on big data. The AI server 1420 is connected to at least one or more of AI devices constituting the AI system, i.e. the robot 1410*a*, the autonomous vehicle 1410*b*, the XR device 1410*c*, the smartphone 1410*d* and/or the home appliance 1410*e* through the cloud network 1400, and may assist at least some AI processing of the connected AI devices 1410*a* to 1410*e*. The AI server 1420 can learn the ANN according to the machine learning algorithm on behalf of the AI devices 1410*a* to 1410*e*, and can directly store the learning models and/or transmit them to the AI devices 1410*a* to 1410*e*. The AI server 1420 may receive the input data from the AI devices 1410*a* to 1410*e*, infer the result value with respect to the received input data using the learning model, generate a response and/or a control command based on the inferred result value, and transmit the generated data to the AI devices 1410*a* to 1410*e*. Alternatively, the AI devices 1410*a* to 1410*e* may directly infer result value for the input data using a learning model, and generate a response and/or a control command based on the inferred result value.

Various embodiments of the AI devices 1410*a* to 1410*e* to which the technical features of the present disclosure can be applied will be described. The AI devices 1410*a* to 1410*e* shown in FIG. 14 can be seen as specific embodiments of the AI device 1300 shown in FIG. 13.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a new Radio Access Control (RAN) node in a wireless communication, the method comprising:

receiving, from a mobility management entity (MME), an Application Protocol (S1AP) paging message for a Mobile Terminated Early Data Transmission (MT EDT) procedure, wherein the S1AP paging message includes (i) an MT EDT indication informing that the MT EDT procedure is triggered and (ii) a Resume ID to retrieve a UE context, and wherein the S1AP paging message is transmitted to each RAN node belonging to a tracking area of the new RAN node;

transmitting, to a UE, a paging message including the MT EDT indication, wherein the UE has suspended a Radio Resource Control (RRC) connection with an old RAN node;

receiving, from the UE, a message including a UE ID and a security key for establishing AS security;

based on that a UE context for the UE is not found, mapping the UE ID onto the Resume ID;

transmitting, to the old RAN node, an X2-AP Retrieve UE Context Request message including the Resume ID and an MT EDT Triggered indication;

receiving, from the old RAN node, an X2-AP Retrieve UE Context Response message associated with the Resume ID;

transmitting, to the MME, an S1-AP Path Switch Request message for resuming the UE Context;

receiving, from the MME, an S1-AP Path Switch Request Acknowledgement message; and transmitting, to the UE, downlink data based on the resumed UE Context.

2. The method of claim 1, wherein the UE is an autonomous driving apparatus in communication with at least one of a mobile terminal, a network, and/or autonomous vehicles other than the UE.

3. A new Radio Access Control (RAN) node in a wireless communication system, the new RAN node comprising:

a memory;

a processor operably coupled to the memory and adapted to perform operations, the operations comprises:

receiving, from a mobility management entity (MME), an Application Protocol (S1AP) paging message for a Mobile Terminated Early Data Transmission (MT EDT) procedure, wherein the S1AP paging message includes (i) an MT EDT indication informing that the MT EDT procedure is triggered and (ii) a Resume ID to retrieve a UE context, wherein the S1AP paging message is transmitted to each RAN node belonging to a tracking area of the new RAN node;

transmitting, to a UE, a paging message including the MT EDT indication, wherein the UE has suspended a Radio Resource Control (RRC) connection with an old RAN node;

receiving, from the UE, a message including a UE ID and a security key for establishing AS security;

based on that a UE context for the UE is not found, mapping the UE ID onto the Resume ID;

transmitting, to the old RAN node, an X2-AP Retrieve UE Context Request message including the Resume ID and an MT EDT Triggered indication;

receiving, from the old RAN node, an X2-AP Retrieve UE Context Response message associated with the Resume ID;

transmitting, to the MME, an S1-AP Path Switch Request message for resuming the UE Context;

receiving, from the MME, an S1-AP Path Switch Request Acknowledgement message; and transmitting, to the UE, downlink data based on the resumed UE Context.

\* \* \* \* \*